(12) United States Patent
Jaeb et al.

(10) Patent No.: US 10,275,759 B2
(45) Date of Patent: Apr. 30, 2019

(54) SYSTEM FOR CONDUCTING TRANSACTIONS INDEPENDENT OF POINT OF SALE SYSTEM

(71) Applicant: CityCheers Media Corp., San Jose, CA (US)

(72) Inventors: Winston Jaeb, San Jose, CA (US); D'Arcy J. Laforge, San Jose, CA (US)

(73) Assignee: CITYCHEERS MEDIA CORP., San Jose, CA (US)

( * ) Notice: Subject to any disclaimer, the term of this patent is extended or adjusted under 35 U.S.C. 154(b) by 887 days.

(21) Appl. No.: 14/866,622

(22) Filed: Sep. 25, 2015

(65) Prior Publication Data

US 2016/0092862 A1 Mar. 31, 2016

Related U.S. Application Data

(60) Provisional application No. 62/056,336, filed on Sep. 26, 2014.

(51) Int. Cl.
*G06Q 20/32* (2012.01)
*G06Q 20/36* (2012.01)

(52) U.S. Cl.
CPC ........... *G06Q 20/325* (2013.01); *G06Q 20/36* (2013.01)

(58) Field of Classification Search
USPC ...................................................... 705/35, 39
See application file for complete search history.

(56) References Cited

U.S. PATENT DOCUMENTS

| | | | | |
|---|---|---|---|---|
| 2010/0250376 | A1* | 9/2010 | Nandiraju | G06Q 20/202 705/17 |
| 2011/0039585 | A1* | 2/2011 | Rouse | G06Q 20/102 455/466 |
| 2013/0103587 | A1 | 4/2013 | Labaton | |
| 2014/0074605 | A1* | 3/2014 | Sanchez | G06Q 20/40 705/14.53 |
| 2014/0229339 | A1* | 8/2014 | Massiere | G06Q 20/3229 705/26.81 |
| 2015/0032623 | A1* | 1/2015 | Friedman | G06Q 20/401 705/44 |

\* cited by examiner

*Primary Examiner* — William E Rankins
(74) *Attorney, Agent, or Firm* — Innovation Counsel LLP

(57) ABSTRACT

A system that allows for conducting merchant transactions independent of a POS system. The system employs both a merchant venue-specific website and a mobile app. A customer at the merchant venue logs into the website with his or her mobile phone, and the mobile app is automatically notified of the login. The venue keeps track of the customer's total bill amount in any way, and enters it into the mobile app, which in turn updates the website with the total amount owed. The customer can then pay his or her bill through the website, via his/her phone. In this manner, a quick and easy payment system is implemented, allowing users to pay with the card or payment method of their choice, without need for a POS system and without need for downloading or installing any additional software on their mobile device.

20 Claims, 4 Drawing Sheets

VENUE CUSTOMER

SYSTEM FOR CONDUCTING TRANSACTIONS INDEPENDENT OF POINT OF SALE SYSTEM

CROSS REFERENCE TO RELATED APPLICATIONS

This application claims priority to, and the benefit of, U.S. Provisional Patent Application No. 62/056,336 filed on Sep. 26, 2014, which is hereby incorporated by reference in its entirety and for all purposes.

BRIEF DESCRIPTION

Embodiments of the present disclosure relate generally to electronic transactions. More specifically, embodiments of the present disclosure relate generally to systems for conducting electronic transactions independent of point of sale systems.

BACKGROUND

Modern Point of Sale (POS) systems have greatly increased the ease and convenience with which many modern financial transactions are conducted. By providing a single location at which a customer's bill is totaled, payment is taken, corresponding records are stored, and a receipt is issued, POS systems allow customers and merchants to complete and record their transactions quickly and easily.

POS systems are, however, not without their drawbacks. POS systems can be expensive and burdensome for merchants to install or implement. Numerous different POS systems exist, many of which do not accept every payment form. POS systems also often rely on a single piece of hardware, such as a register, that requires customers to move to that location to conduct their transactions. Attempts to solve this problem by implementing multiple POS registers at a single merchant incur significant expense due to the added hardware required.

Conventional online fixes for these problems typically involve use of a mobile application program, or mobile app, that customers can download and that allow customers to pay online through the mobile app. However, such mobile apps present their own challenges. For example, payment services often require customers to use their app, so that each app only allows payment through a single service. Customer payments are also sent to an account run by that payment service, rather than the bank account of the customer's choice. Also, the requirement to download and install an app can lead to clutter if a customer desires to use multiple different payment services at different times, and thus must download/install multiple apps just for payment. Finally, app download and installation may simply require time and effort that customers do not wish to invest, and can compromise customer security if the app is ever compromised.

Ongoing efforts thus exist to improve the ways by which customers and merchants conduct transactions.

SUMMARY

The invention can be implemented in many different ways. In one exemplary embodiment, one or more non-transitory computer-readable media collectively store instructions that, when executed, cause one or more computers to collectively perform a method of conducting transactions at a venue independent of a point of sale system. The instructions comprise: a first set of instructions for generating a website, the website corresponding to a particular merchant venue and responsive to a first mobile computing device; and a second set of instructions comprising a mobile application program executable on a second mobile computing device. The website is operable to: check in a user to the particular merchant venue responsive to check in information transmitted from the first mobile computing device, transmit an indicator to the application program that the user has checked in at the particular merchant venue, receive an amount of a currency owed by the user from the application program, transmit the amount to the first mobile computing device, receive a payment instruction from the first mobile computing device for paying at least the amount, and initiate a financial transaction between the user and the merchant paying the at least the amount from the user to the merchant. The mobile application program is operable to: responsive to the indicator, display an indication that the user has checked in, receive the amount of a currency owed by the user as input from the second mobile computing device, transmit the amount of a currency owed by the user to the website, and upon completion of the financial transaction, receive an indicator that the user has paid at least the amount of a currency owed.

The website may be operable to receive at least one payment card number, and to transmit the at least one payment card number in association with the financial transaction. The website may be further operable to receive multiple payment card numbers, and to transmit the multiple payment card numbers for persistent storage.

The website may allow the first mobile computing device to select from among the multiple payment card numbers so as to receive an indication of a selected card number from among the multiple payment card numbers, and to initiate the financial transaction using the selected card number.

The amount of a currency may be a first amount, and the payment instruction may comprise an instruction for paying a second amount of the currency, the second amount being greater than the first amount.

The instructions may further comprise a third set of instructions for generating a content manager in electronic communication with the mobile application program, the content manager operable to receive the indicator that the user has checked in, to transmit the indicator to the mobile application program, to receive the amount of currency owed from the mobile application program, to transmit the amount of currency owed to the website, and to transmit the indicator that the user has paid to the mobile application program.

The instructions may also comprise a third set of instructions for generating a content manager, the content manager operable to receive information corresponding to the particular merchant venue, and to initiate generation of the website using the received information corresponding to the particular merchant venue.

The information corresponding to the particular merchant venue may comprise at least one of a merchant logo, graphics, color scheme, and merchant text content.

The content manager may be further operable to perform at least one of: initiating an application for a secondary merchant identification for conducting the financial transaction, and initiating a request for gateway credentials corresponding to the merchant venue.

It may also be that neither the website nor the mobile application program is operable to communicate electronically with the point of sale system.

In another embodiment, a method of conducting transactions at a merchant venue comprises receiving, at a website and from a first mobile computing device located at a merchant venue, a check-in request to check in at the merchant venue; in response to the receiving, and transmitting, to a second computing device located at the merchant venue, an indicator that the user has checked in; receiving, from the second computing device, an amount of currency owed. The method also includes transmitting to the website the amount of currency owed; receiving, through the website and from the first mobile computing device, an instruction to carry out a financial transaction using a specified payment card number so as to pay at least the amount of currency owed; and initiating the financial transaction with the specified payment card number. The method further includes receiving a notice of completion of the financial transaction; and transmitting, to the first mobile computing device and to the second computing device, an indicator that the financial transaction was completed.

The method may further comprise receiving, through the website, the payment card number; and receiving, through the website, multiple payment card numbers. The method may also include receiving, through the website, a selection from among the multiple payment card numbers, so as to designate the specified payment card number.

The instruction to carry out a financial transaction may be an instruction to pay an amount of currency greater than the amount of currency owed.

The transmitting, to a second computing device located at the merchant venue may further comprise transmitting, to a content manager program in electronic communication with the second computing device, the indicator that the user has checked in. The receiving, from the second computing device, an amount of currency owed may further comprise receiving, at the content manager program, the amount of currency owed.

The method may further comprise receiving information corresponding to the merchant venue, and initiating generation of the website using the received information corresponding to the merchant venue.

The information corresponding to the particular merchant venue may comprise at least one of a merchant logo, graphics, color scheme, and merchant text content.

The method may further comprise: initiating an application for a secondary merchant identification for conducting the financial transaction, and initiating a request for gateway credentials corresponding to the merchant venue.

The method may include a case in which neither the first mobile computing device nor the second computing device is a part of a point of sale system.

BRIEF DESCRIPTION OF THE FIGURES

For a better understanding of the invention, reference should be made to the following detailed description taken in conjunction with the accompanying drawings, in which.

Like reference numerals refer to corresponding parts throughout the drawings. The various Figures are not necessarily to scale.

DETAILED DESCRIPTION

One embodiment of the invention provides a system that allows customers and merchants to conduct electronic transactions without need for a POS system. Merchants employ a mobile application program implemented on a mobile computing device separate from their POS system. Also employed is a merchant-specific website that customers can access with their mobile devices. The merchant's application and the separate website work together to allow customers to pay their bill through the application, not through the POS system. In particular, the merchant app records the amount owed by the customer and transmits this amount to the website. The customer can then pay his/her amount owed electronically, through the website, immediately and on premises, without need for the POS system. In this manner, customers can pay conveniently at their table, for example, without moving to the POS register and even without need for the merchant to physically present customers their bills. Also, as the customer interface is a website rather than a mobile app, customers can pay by accessing a website, rather without being required to download or install any applications.

Systems of embodiments of the invention also allow for convenient online storage of payment card information, allowing the system to act as a digital wallet solution for customers.

Figure 1:
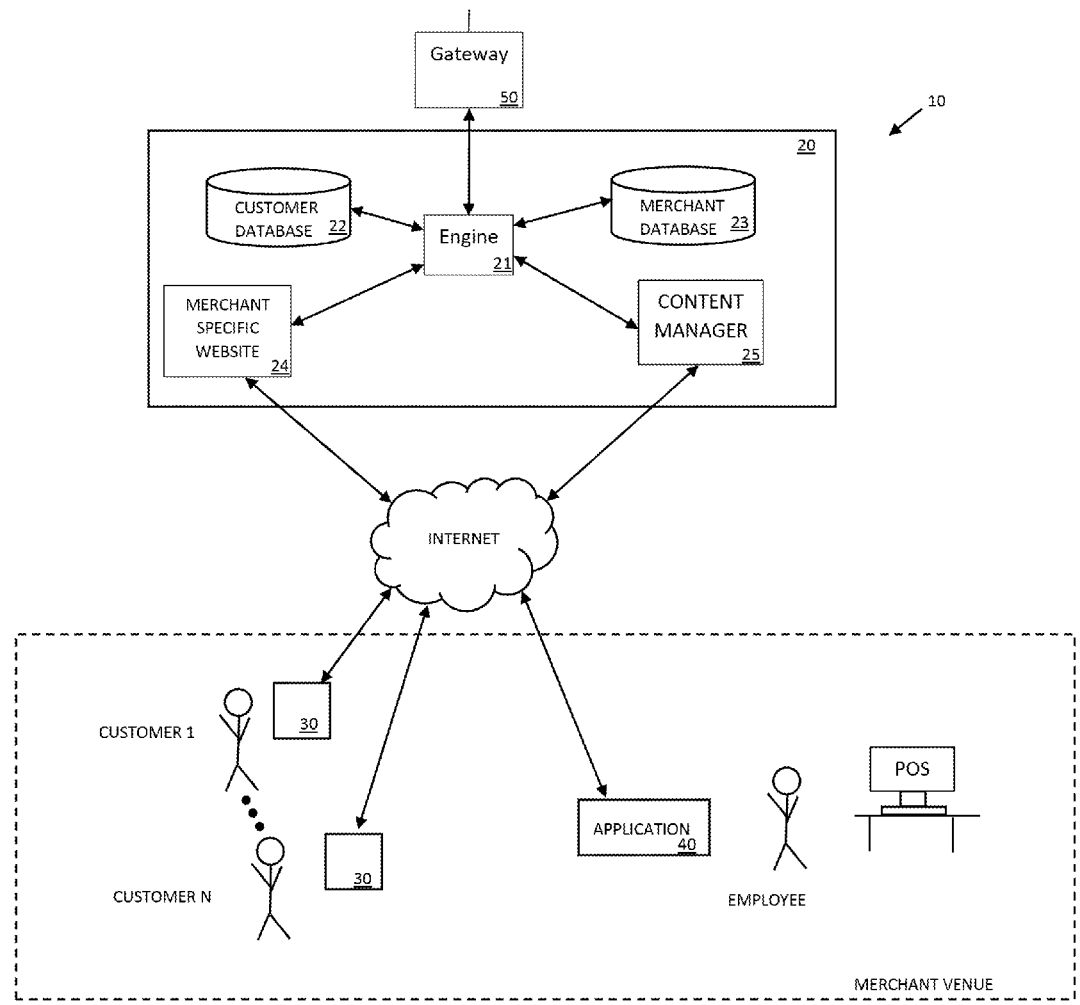
FIG. 1 illustrates an exemplary computer-based system for implementing embodiments of the present invention.

FIG. 1 illustrates an exemplary system for implementing embodiments of the present invention. In FIG. 1, system 10 includes a server 20 connected to the Internet or other computer-based communications network, along with any number of customer mobile devices 30 and merchant mobile devices 40. The customer mobile devices 30 can be any mobile computational devices such as smartphones, tablet computers, laptops, or the like. The customer mobile devices 30 can access websites through the Internet, including those hosted by server 20, and allow their users to exchange information with these websites. The merchant mobile devices 40 can be any computational device, mobile or otherwise, including personal computers and the like. It may, however, be preferable for the merchant mobile devices 40 to be tablet computers. Each merchant mobile device 40 can run one or more application programs for interfacing and communicating with the server 20.

The server 20 includes an engine or processor 21, a customer database 22 and a merchant database 23, and hosts any number of merchant-specific websites 24. The server 20 also runs a content manager 25. The various databases can exist as separate databases, or may be combined in any manner. That is, one or more databases can contain and/or take on the roles of any one or more of the databases 22, 23. The various elements 22, 23, 24, and 25 can also be implemented on multiple servers rather than just one server 20. Additionally, the server 20 can be implemented as one or more physical servers, or can be implemented as one or more virtual servers.

The system 10 also includes a gateway 50, which is a known hosted software product that provides integration between the websites 24 and other elements of an electronic payment processing network. These elements include credit card networks and bank servers. These other elements and their interactions with gateway 50 are known.

FIG. 1 also conceptually illustrates operation of system 10. In operation, any number of customers (customer1 . . . customerN) may enter the Merchant Venue, which may as a nonlimiting example be a restaurant. Once onsite, customer1 for example may load the merchant-specific website 24 on his or her device 30, login, and notify an Employee of the Merchant Venue that they are paying via the website. Having logged in, website 24 informs the device 40, so that customer1 now shows up on the Merchant Venue app running on device 40. The Employee keeps track of customer1's order, possibly on the POS or by some other method, and enters the total under customer1's name on device 40, whereupon customer1 can pay this total, plus any tip, through his/her device 30 at any time, without need for the Employee to visit customer1's table. Payment is processed through the gateway 50, which notifies the server 20 when payment has gone through. The server 20 in turn directs the app on device 40 to indicate that the customer has paid, whereupon the Employee can close the ticket. Records of each order/visit/transaction may be stored in the databases 22 and 23, so that the system 10 may keep a record of each customer's usages/transactions as well as each merchant's. At the end of his or her shift, the Employee can run a report from device 40 of transactions, totals and tips, etc. and attach this report to a corresponding report from the POS, or simply retain the report for the Merchant's records.

Figure 2:
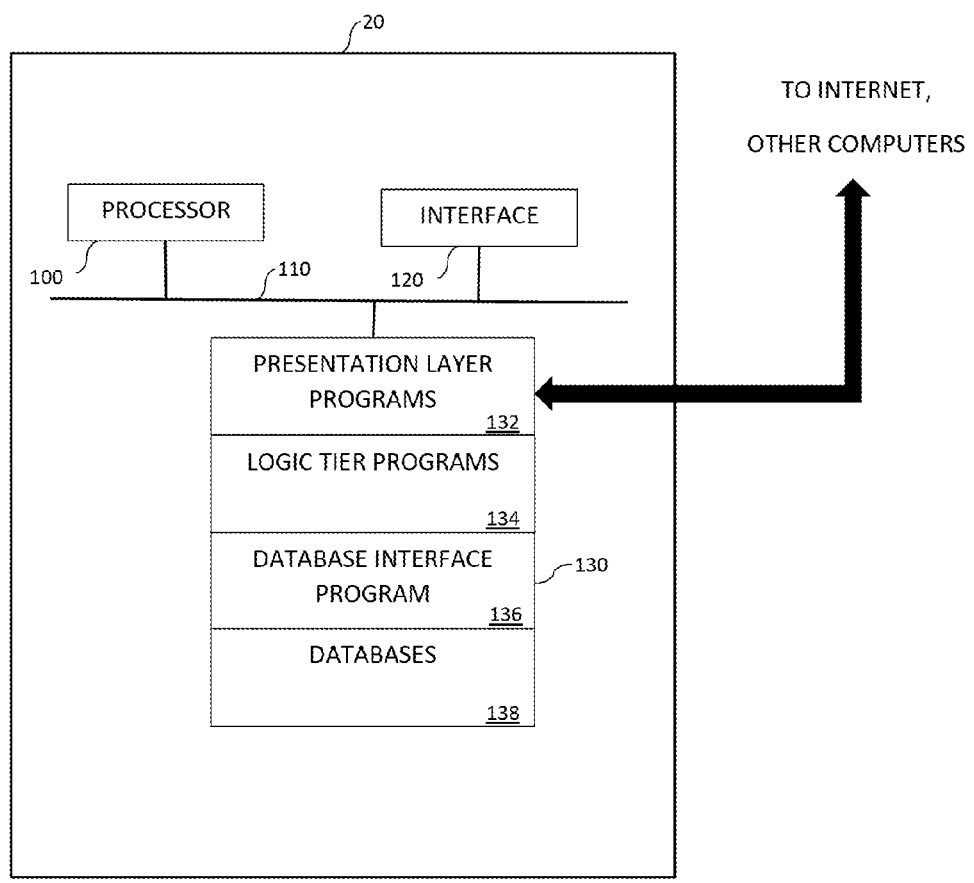
FIG. 2 conceptually illustrates further details of a server for implementing embodiments of the present invention.

While the server 20 and various other computational devices of FIG. 1 can be constructed in any manner, and contain any programs suitable for operation as above and below, FIG. 2 illustrates further details of one embodiment of server 20. Here, server 20 includes a processor 100, bus 110, interface 120, and memory 130. The processor 100, interface 120, and memory 130 are in communication across bus 110. The processor 100 executes instructions contained in the programs of memory 130, while the interface 120 allows communication with the other computational devices of FIG. 1 via the Internet or other electronic communication medium. The processor 100, interface 120, and programs of the memory 130 which carry out the above and below processes collectively can be thought of as making up the engine 21.

The memory 130 stores a number of programs, including presentation layer programs 132, logic tier programs 134, database interface programs 136, and databases 138. The databases 138 may include any of the databases used to organize and store information, including the above described databases 22 and 23. The database interface programs 136 may include those programs configured to act as an interface for the databases 138 to the logic tier 134, as is known. The logic tier programs 134 are database access layer programs, and access the database interface programs 136 as well as other remote programs (such as financial transaction, authentication, etc. programs) to retrieve desired information stored in the databases 138 or store information as appropriate. The logic tier programs 134 transfer information between end user application programs and databases 138, to allow for the transfer of information between the databases 138 and end users as described herein. The construction of such logic tier programs 134 is known. The presentation layer programs 132 are application programs providing an interface to end users, and include programs and other code such as those of websites 24 and content manager 25.

Figure 3:
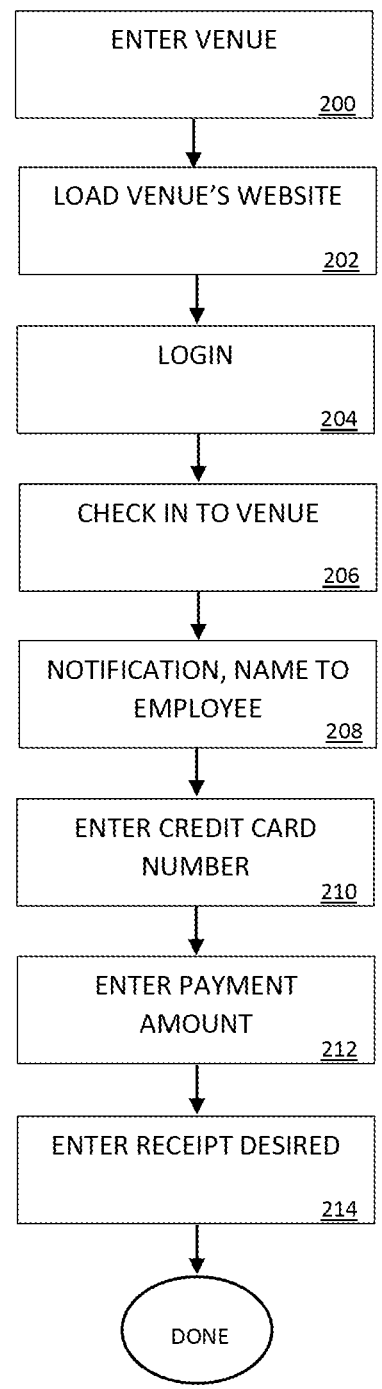
FIG. 3 is a flowchart illustrating steps taken by customers in accordance with embodiments of the present invention.

FIG. 3 illustrates further details of the process by which customers conduct transactions at merchant venues. As above, a restaurant is used as the exemplary Merchant Venue, although embodiments of the invention contemplate any commercial establishment. The customer may enter the particular Merchant Venue (Step 200), whereupon he or she is informed of the Merchant Venue's merchant-specific website. The customer may then load this merchant-specific website on the browser of his or her device 30 (Step 202). The website prompts the customer to login (Step 204), and then to check in to the Merchant Venue (Step 206). As above, checking in prompts the server 20 to update the mobile app on Merchant Venue device 40, indicating that the username of the logged-in customer is now present onsite. The customer may then notify an Employee of the customer's username, and that he/she will be paying through the website electronically (Step 208). Once the meal is finished, an Employee enters the customer's total bill amount in the app running on device 40, which is transmitted to server 20 and on to the device 30 along with a prompt to pay. Upon agreeing to pay, the customer is allowed to enter a payment card number, such as a credit or debit card number (Step 210), as well as their total payment amount, which may include a tip in addition to the amount entered by the Employee (Step 212). Upon agreeing to the transaction, the server 20 and gateway 50 complete the financial transaction in known manner. When the gateway 50 returns an indication that payment has occurred and the transaction has been completed, the engine 21 performs actions such as emailing or otherwise transmitting a receipt to the customer (Step 214), completing the process.

Financial transactions may be completed in any manner. For example, when card information is entered such as at Step 210, the system 10 may store this information in database 22 and/or at a secured payment page hosted by gateway 50. That is, gateway 50 may store user card information rather than server 20, perhaps for security purposes. Completion of a financial transaction may thus involve gateway 50 returning a tokenized ID for this particular transaction, which is saved in database 22. For security reasons, only the token, last four digits of the card number, and expiration date may be retained in database 22. The token may be associated with a master merchant account associated with system 10 and stored on gateway 50, rather than being associated with the particular merchant. This allows customers with a user account stored in server 20 to store payment methods and use them across multiple different merchant apps, as a common token is used in each transaction at each different merchant.

In addition to allowing customers to make paperless payments, system 10 may also act as a digital wallet. For example, when customers enter their credit or other payment card information at Step 210, the server 20 may prompt the customer as to whether he or she wishes to keep their card information on file for use in future transactions. If the customer agrees via website 24, the engine 21 stores this information in the customer database 22 (or elsewhere, such as at gateway 50), whereupon it can be retrieved for use in future transactions. In this manner, information on multiple different cards may be stored for the same user, associated with that username in database 22. The user can thus be allowed to pick which stored card he/she wishes to use for any given transaction, and the server 20 and gateway 50 can carry out the transaction using that selected card. The user may also be displayed a list of his/her cards for which information is stored in database 22, where the user can select any card for removal (deletion from database 22) or designation as Primary. Removal may also remove the card information from the user's digital wallet on the gateway 50, if one exists.

If the user has not logged in to server 20 before, Step 204 may also include prompting the user or customer to create a new user account, with for example a username and password. This user information is then stored along with subsequently-entered card information in customer database 22.

Figure 4:
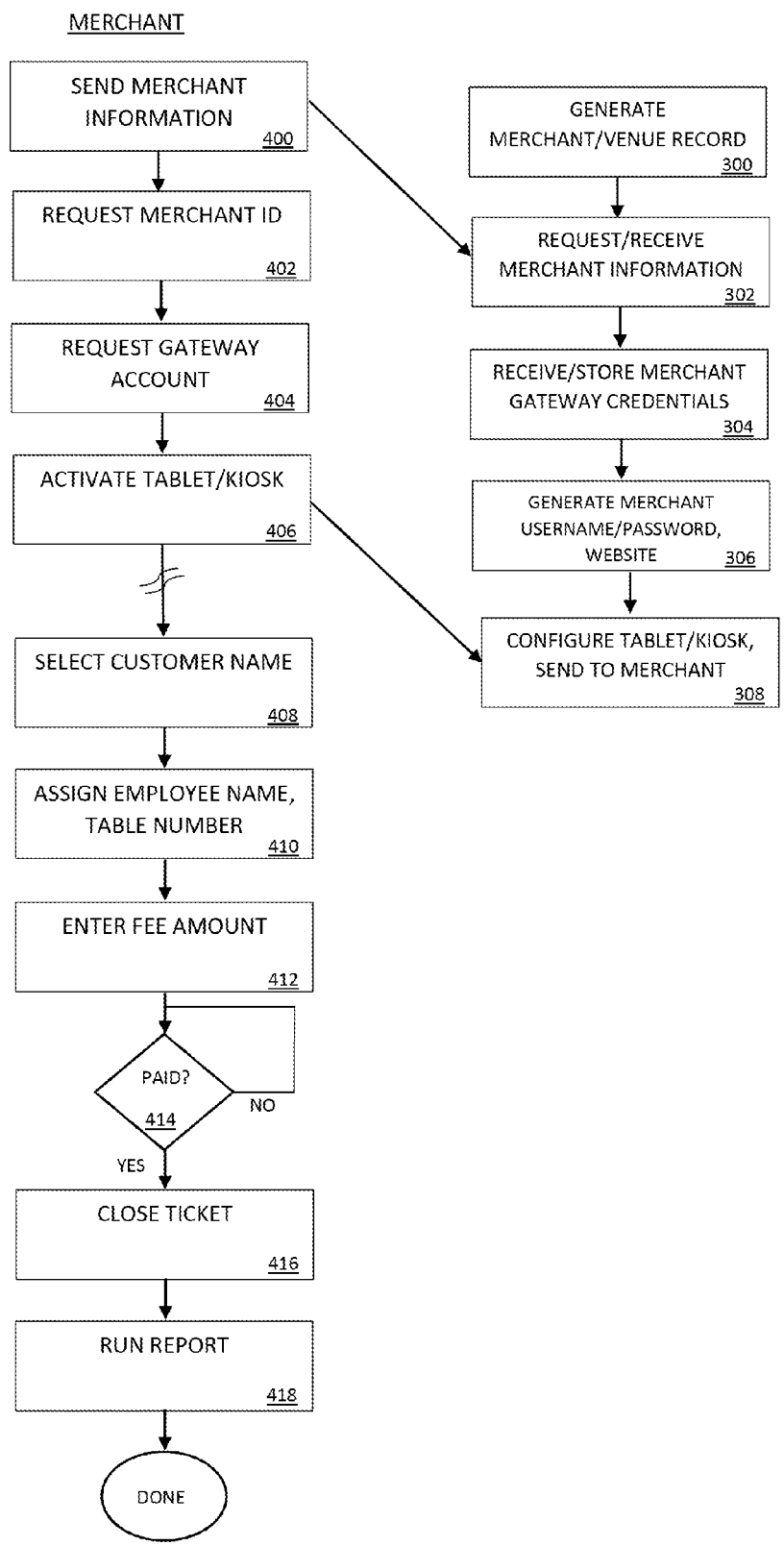
FIG. 4 is a flowchart illustrating steps taken by merchants and a backend system in accordance with embodiments of the present invention.

The user/customer process having been described, attention now turns to the merchant setup and use processes. FIG. 4 is a flowchart illustrating steps taken in both these merchant processes. First, an exemplary merchant setup process is described. A merchant signs up for the service described herein, via content manager 25, which is a control panel or interface allowing for automated merchant signup. Upon signup, a record or account specific to the Merchant Venue is generated and stored in merchant database 23 (Step 300). The content manager 25 then prompts the merchant to enter any other desired merchant information, which can be any desired information, such as a physical address, email address, etc. The merchant may also enter other information through content manager 25, such as a logo, graphics, color scheme, and other content like a description of their venue or other text. All this information is stored in database 23 to be associated with the merchant-specific record (Step 302). The content manager 25 then prompts the merchant to apply for an account with gateway 50, which is a gateway that is integrated with system 10. Once gateway approval is made, the gateway 50 sends merchant-specific gateway credentials to server 20, where they are stored along with the merchant record in database 23 (Step 304). At this point, the engine 21 generates a unique merchant username and password (Step 306), which are transmitted to the merchant. The engine 21 at this point may also generate merchant-specific website 24 using the stored merchant logo, color scheme, graphics, etc., which is linked to the merchant record and stored in the presentation layer programs 132 for execution by a customer. The merchant-specific website 24 may be automatically generated by the content manager 25 in known manner, or may be custom-generated by a user.

Separately, a tablet computer 40 may be configured with an above-described mobile app, and sent to the Merchant Venue for use as previously described (Step 308). This mobile app may be programmed to allow the device 40 to act as a kiosk, displaying a control panel that is logged in to the merchant's account and in communication with engine 21 to allow the merchant to enter and receive information as above. A particular Merchant Venue may be given multiple tablet computers 40 to facilitate convenient use by multiple Employees.

Next, exemplary merchant use of system 10 is illustrated. Merchant setup is described in Steps 400-406 from the point of view of the merchant, and corresponds to Steps 300-308 from the point of view of the system 10. Subsequent merchant use is described in Steps 408-418. As to setup, when the merchant desires to sign up for the service described herein, the merchant logs into the content manager 25 and enters the requested information, i.e. identifying information, logo, graphics, etc. (Step 400, corresponding to Step 302). The merchant may then optionally apply for a secondary merchant ID (Step 402) that can be used in processing some online payments. The merchant is also prompted to enter all information for requesting a gateway account (Step 404). Upon completion of these Steps, the merchant is sent a tablet 40 configured with an app as in Step 308 and set up for the above mentioned transactions (Step 406).

Once the tablet 40 is received at the Merchant Venue, it may be used to complete transactions in tandem with the merchant-specific website 24. In particular, once a customer notifies an Employee that he/she is paying via the website 24 and gives his/her username, the Employee selects this username (Step 408) from the list of users displayed on tablet 40 (corresponding to users logged in through the website 24, whose usernames are transmitted to tablet 40 via engine 21 at Step 206). The Employee then assigns an Employee name (e.g., waiter name) and table number to the customer's username via prompts from the app on tablet 40 (Step 410). Once the customer has completed his/her meal, the Employee/waiter totals up the customer's bill, such as by hand or via the POS, and enters the total in the app on tablet 40 (Step 412). Once the customer's payment is completed as through Step 212 above (Step 414), the Employee can close out the customer's ticket (Step 416) and, at a later time, run a report if desired (Step 418), whereupon the process ends. If payment is unsuccessful after a predetermined amount of time, or if the gateway 50 returns a payment declined message, the process returns to Step 414 where the customer is allowed to retry payment, perhaps with the option to try a different card.

Embodiments of the invention thus describe a system that allows for conducting merchant transactions independent of a POS system (note that no part of system 10 is part of the POS system or exchanges information electronically with the POS, or at least none is required to). The system employs both a merchant venue-specific website and a mobile app. A customer at the merchant venue logs into the website with his or her mobile phone, and the mobile app is automatically notified of the login. The venue keeps track of the customer's total bill amount in any way, and enters it into the mobile app, which in turn updates the website with the total amount owed. The customer can then pay his or her bill through the website, via his/her phone. In this manner, a quick and easy payment system is implemented, allowing users to pay with the card or payment method of their choice, without need for a POS system and without need for downloading or installing any additional software on their mobile device.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed.

Many modifications and variations are possible in view of the above teachings. For example, the tactical light of embodiments of the invention may be made in any shape and size, and may be made of any material that is sufficiently transparent and of high enough strength to withstand tossing against hard surfaces, being stepped on, driven over, and the like. The embodiments were chosen and described in order to best explain the principles of the invention and its practical applications, to thereby enable others skilled in the art to best utilize the invention and various embodiments with various modifications as are suited to the particular use contemplated. Also, individual features of any of the various embodiments or configurations described above can be mixed and matched in any manner, to create further embodiments contemplated by the invention.

What is claimed is:

1. One or more non-transitory computer-readable media collectively storing instructions that, when executed, cause one or more computers to collectively perform a method of conducting transactions at a venue independent of a point of sale system, the instructions comprising:
- a first set of instructions for generating a website, the website corresponding to a particular merchant venue and responsive to a first mobile computing device; and
- a second set of instructions comprising a mobile application program executable on a second mobile computing device;
- wherein the website is operable to:
  - check in a user to the particular merchant venue responsive to check in information transmitted from the first mobile computing device,
  - transmit an indicator to the application program that the user has checked in at the particular merchant venue,
  - receive an amount of a currency owed by the user from the application program, transmit the amount to the first mobile computing device,
  - receive a payment instruction from the first mobile computing device for paying at least the amount, and
  - initiate a financial transaction between the user and the merchant paying the at least the amount from the user to the merchant; and
- wherein the mobile application program is operable to:
  - responsive to the indicator, display an indication that the user has checked in,
  - receive the amount of a currency owed by the user as input from the second mobile computing device,
  - transmit the amount of a currency owed by the user to the website, and
  - upon completion of the financial transaction, receive an indicator that the user has paid at least the amount of a currency owed.

2. The non-transitory computer-readable media of claim 1, wherein the website is further operable to receive at least one payment card number, and to transmit the at least one payment card number in association with the financial transaction.

3. The non-transitory computer-readable media of claim 2, wherein the website is further operable to receive multiple payment card numbers, and to transmit the multiple payment card numbers for persistent storage.

4. The non-transitory computer-readable media of claim 3, wherein the website is further operable to allow the first mobile computing device to select from among the multiple payment card numbers so as to receive an indication of a selected card number from among the multiple payment card numbers, and to initiate the financial transaction using the selected card number.

5. The non-transitory computer-readable media of claim 1, wherein the amount of a currency is a first amount, and the payment instruction comprises an instruction for paying a second amount of the currency, the second amount being greater than the first amount.

6. The non-transitory computer-readable media of claim 1, wherein the instructions further comprise a third set of instructions for generating a content manager in electronic communication with the mobile application program, the content manager operable to receive the indicator that the user has checked in, to transmit the indicator to the mobile application program, to receive the amount of currency owed from the mobile application program, to transmit the amount of currency owed to the website, and to transmit the indicator that the user has paid to the mobile application program.

7. The non-transitory computer-readable media of claim 1, wherein the instructions further comprise a third set of instructions for generating a content manager, the content manager operable to receive information corresponding to the particular merchant venue, and to initiate generation of the website using the received information corresponding to the particular merchant venue.

8. The non-transitory computer-readable media of claim 7, wherein the information corresponding to the particular merchant venue comprises at least one of a merchant logo, graphics, color scheme, and merchant text content.

9. The non-transitory computer-readable media of claim 7, wherein the content manager is further operable to perform at least one of:
- initiating an application for a secondary merchant identification for conducting the financial transaction, and
- initiating a request for gateway credentials corresponding to the merchant venue.

10. The non-transitory computer-readable media of claim 1, wherein neither the website nor the mobile application program is operable to communicate electronically with the point of sale system.

11. A method of conducting transactions at a merchant venue, the method comprising:
- receiving, at a website and from a first mobile computing device located at a merchant venue, a check-in request to check in at the merchant venue;
- in response to the receiving, transmitting, to a second computing device located at the merchant venue, an indicator that the user has checked in;
- receiving, from the second computing device, an amount of currency owed;
- transmitting to the website the amount of currency owed;
- receiving, through the website and from the first mobile computing device, an instruction to carry out a financial transaction using a specified payment card number so as to pay at least the amount of currency owed;
- initiating the financial transaction with the specified payment card number;
- receiving a notice of completion of the financial transaction; and
- transmitting, to the first mobile computing device and to the second computing device, an indicator that the financial transaction was completed.

12. The method of claim 11, further comprising receiving, through the website, the payment card number.

13. The method of claim 12, wherein the receiving, through the website, the payment card number further comprises receiving multiple payment card numbers.

14. The method of claim 13, further comprising receiving, through the website, a selection from among the multiple payment card numbers, so as to designate the specified payment card number.

15. The method of claim 11, wherein the instruction to carry out a financial transaction is an instruction to pay an amount of currency greater than the amount of currency owed.

16. The method of claim 11:
- wherein the transmitting, to a second computing device located at the merchant venue further comprises transmitting, to a content manager program in electronic communication with the second computing device, the indicator that the user has checked in; and
- wherein the receiving, from the second computing device, an amount of currency owed further comprises receiving, at the content manager program, the amount of currency owed.

17. The method of claim 11, further comprising receiving information corresponding to the merchant venue, and initiating generation of the website using the received information corresponding to the merchant venue.

18. The method of claim 17, wherein the information corresponding to the particular merchant venue comprises at least one of a merchant logo, graphics, color scheme, and merchant text content.

19. The method of claim 11, further comprising:
 initiating an application for a secondary merchant identification for conducting the financial transaction, and
 initiating a request for gateway credentials corresponding to the merchant venue.

20. The method of claim 11, wherein neither the first mobile computing device nor the second computing device is a part of a point of sale system.

* * * * *